US010240244B2

United States Patent
Arumugam et al.

(10) Patent No.: US 10,240,244 B2
(45) Date of Patent: Mar. 26, 2019

(54) PORTABLE, LIQUID FREE, ELECTROLESS, ELECTROCHEMICAL DEPOSITION OF METAL ON CONDUCTIVE AND NONCONDUCTIVE SURFACES

(71) Applicant: Oceanit Laboratories, Inc., Honolulu, HI (US)

(72) Inventors: Ganesh Kumar Arumugam, Honolulu, HI (US); Ashavani Kumar, Honolulu, HI (US); Vinod P. Veedu, Houston, TX (US); Sumil Thapa, Honolulu, HI (US)

(73) Assignee: Oceanit Laboratories, Inc., Honolulu, HI (US)

( * ) Notice: Subject to any disclaimer, the term of this patent is extended or adjusted under 35 U.S.C. 154(b) by 770 days.

(21) Appl. No.: 14/656,217

(22) Filed: Mar. 12, 2015

(65) Prior Publication Data
US 2016/0177463 A1    Jun. 23, 2016

Related U.S. Application Data

(60) Provisional application No. 61/951,912, filed on Mar. 12, 2014.

(51) Int. Cl.
| | |
|---|---|
| *C25D 17/02* | (2006.01) |
| *C25D 5/22* | (2006.01) |
| *C25D 17/14* | (2006.01) |
| *C25D 17/00* | (2006.01) |
| *B29C 39/00* | (2006.01) |
| *B29L 31/00* | (2006.01) |

(52) U.S. Cl.
CPC .............. *C25D 5/22* (2013.01); *B29C 39/003* (2013.01); *C25D 17/005* (2013.01); *C25D 17/14* (2013.01); *B29K 2995/0005* (2013.01); *B29L 2031/7722* (2013.01)

(58) Field of Classification Search
CPC ............................ C25D 17/001; C25D 17/02
USPC ...................................... 204/224 R
See application file for complete search history.

(56) References Cited

U.S. PATENT DOCUMENTS

| | | | |
|---|---|---|---|
| 5,051,324 A | 9/1991 | Bones et al. | |
| 6,291,091 B1 | 9/2001 | Preischl et al. | |
| 2011/0083965 A1* | 4/2011 | Reid | C25D 3/38 205/101 |
| 2012/0111719 A1 | 5/2012 | Kendig et al. | |
| 2012/0222967 A1* | 9/2012 | Oakes | C25B 1/003 205/637 |

FOREIGN PATENT DOCUMENTS

| | | |
|---|---|---|
| JP | 05148681 A | 6/1993 |
| JP | 2002367634 A | 12/2012 |

* cited by examiner

*Primary Examiner* — Zulmariam Mendez
(74) *Attorney, Agent, or Firm* — James Creighton Wray; Meera P. Narasimhan

(57) ABSTRACT

Electroless plating is accomplished by forming a metal salt and a polymer solution as a binder into a solid electrolyte block and depositing metal on the surface by rubbing or brushing the solid electrolyte block onto a surface with minimal or no water and without an electric potential/power source. The solid electrolyte block is also conformable/moldable and can be used to deposit metal on to both conductive and nonconductive surface through electroless deposition process.

21 Claims, 3 Drawing Sheets

Photograph of Steel coupon and Solid Electrolyte

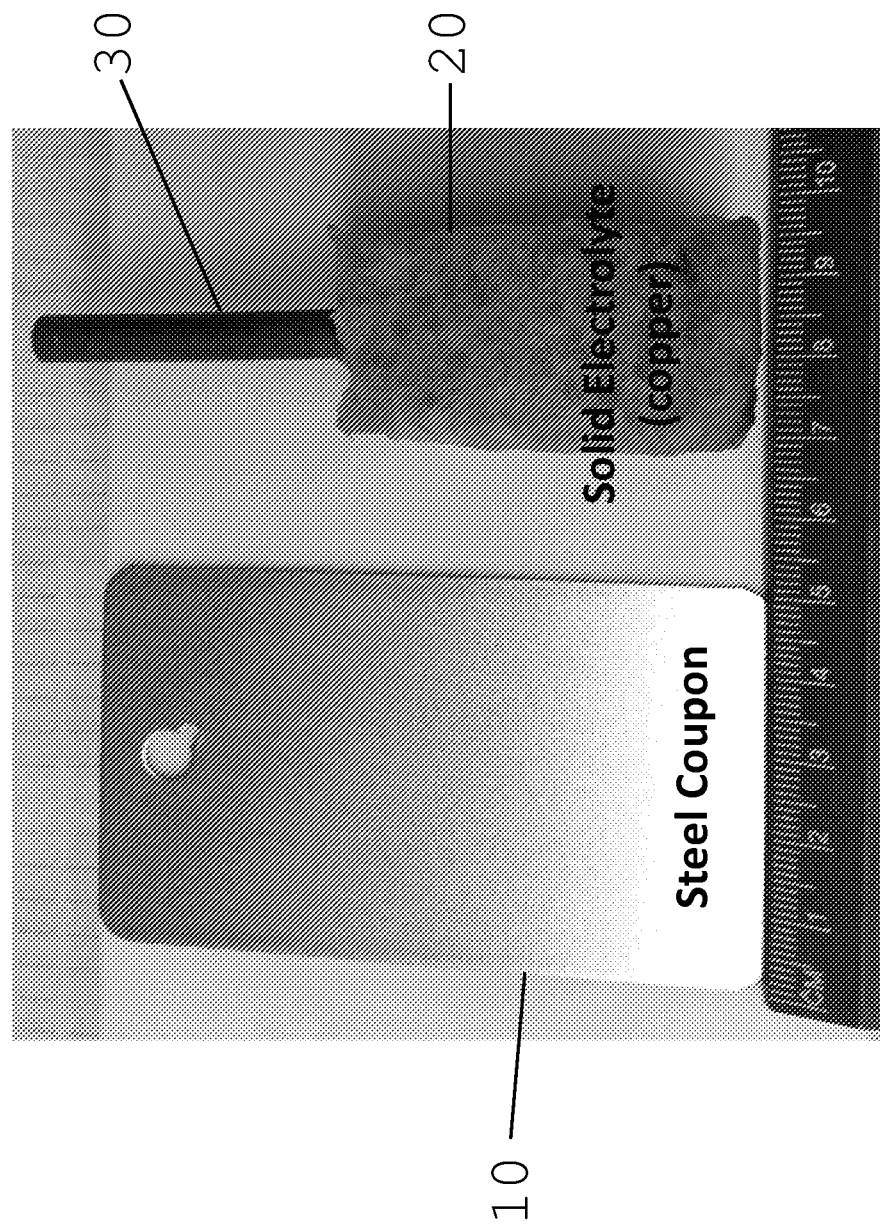
Figure 1: Photograph of Steel coupon and Solid Electrolyte

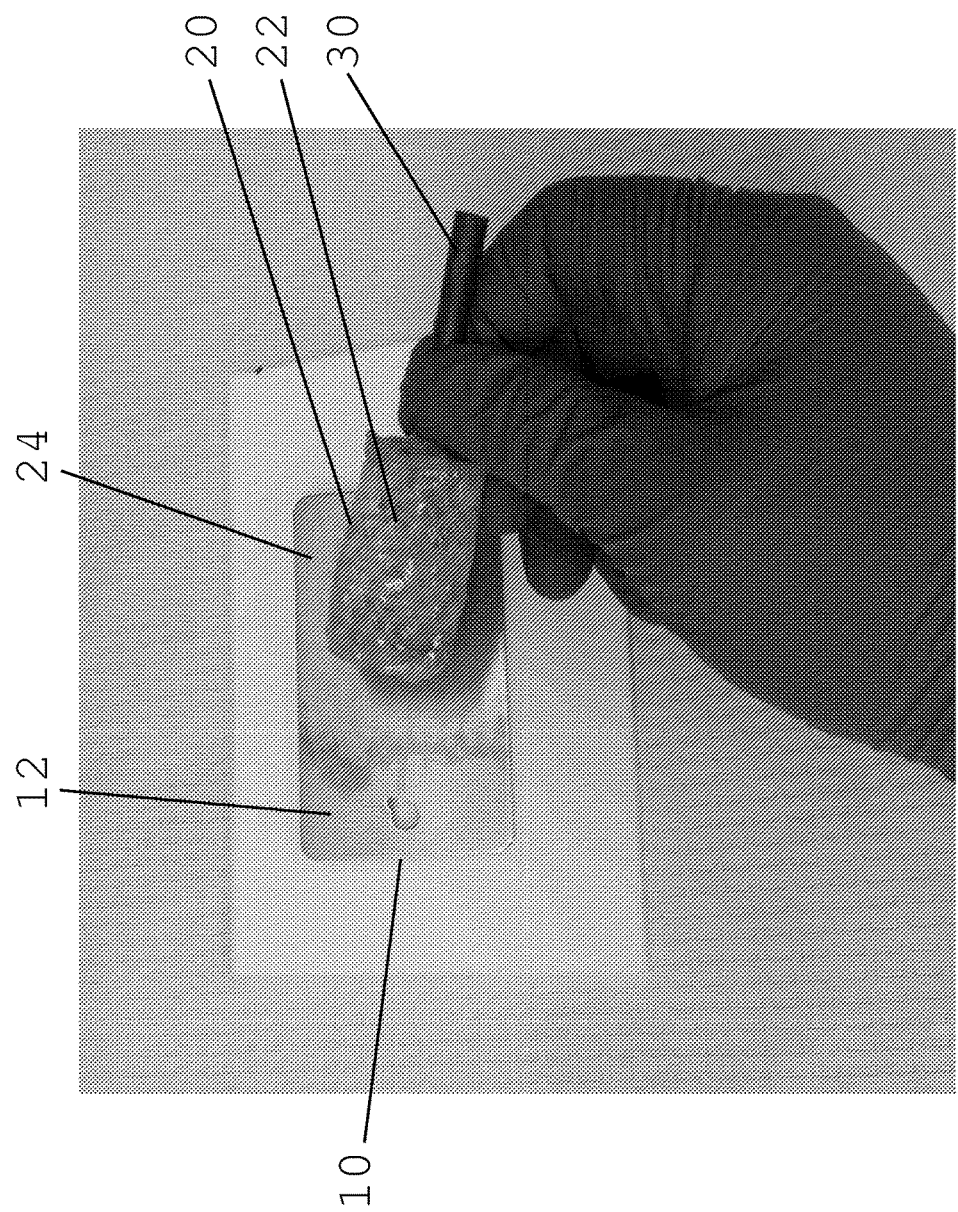
Figure 2: Photograph of Solid Electrolyte rubbed on to the steel coupon resulting in copper deposition

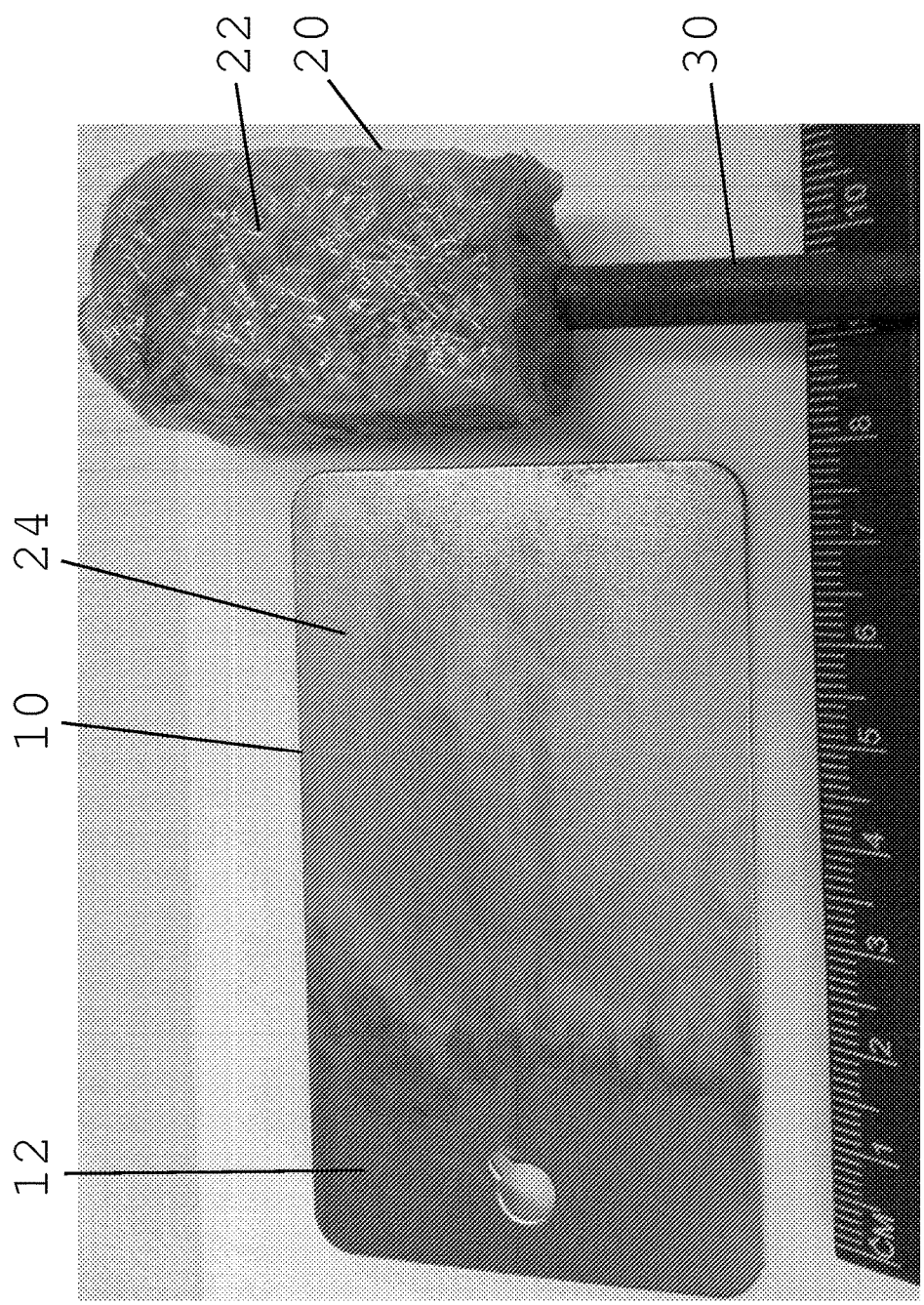
Figure 3: Photograph of copper deposited on Steel coupon using solid electrolyte

PORTABLE, LIQUID FREE, ELECTROLESS, ELECTROCHEMICAL DEPOSITION OF METAL ON CONDUCTIVE AND NONCONDUCTIVE SURFACES This application claims the benefit of U.S. Provisional Application No. 61/951,912 filed Mar. 12, 2014, which is hereby incorporated by reference in its entirety as if fully set forth herein.

This invention was made with Government support under Contract N00014-09-C-0177 awarded by the Office of Naval Research. The Government has certain rights in this invention.

FIELD OF THE INVENTION

The invention applies to electroplating, metal deposition, electroless plating, surface cleaning, surface modification, surface preparation, selective metal coating.

BACKGROUND OF THE INVENTION

Conventional methods of electroplating or electroless plating use a liquid electrolyte with an anode and a cathode. The metal ion from the electrolyte is deposited on to the cathode when an electric potential is applied. Electroless plating immerses an object in a hazardous electroplating bath. Electroless deposition is used to deposit metal on conductive or nonconductive surfaces through an autocatlytic reaction through which metal is deposited without the application of electric potential. Another alternative electroplating process is called brush plating that uses a cloth covered brush plating wand that can be dipped in electroplating solution. A potential is applied between the wand and the depositing surface. Brush plating is similar to painting wherein a wand or cloth covered wand or brush wetted with electrolyte can be brushed on the surface to deposit metal.

There are several drawbacks on current state of the art electroplating, electroless plating and brush plating. One of the biggest drawbacks of electroplating, brush plating or electroless plating is the use of toxic and hazardous liquid electrolytes that makes the process difficult to be a portable technique.

The need for electrochemical potential to drive deposition reaction makes the deposition technique viable only on conductive metal surfaces and requires a power source to drive the deposition. The process is labor intensive. Liquid electrolyte does not allow repair of more intricate, damaged structures in hard to reach areas.

Traditional electroplating, brush plating or electroless plating have been used to coat metal on various metallic surfaces, but have several drawbacks in terms of portability, ease of application, toxicity and safety of electrolyte solution.

Needs exist for improved deposition of metals on surfaces.

SUMMARY OF THE INVENTION

This invention is a novel metal-electrolyte assembly to selectively deposit metal on metal, polymer or ceramic surfaces with or without the aid of external stimuli, such as electric potential, heat or light, etc. to drive the metal ion deposition. The invention is a novel metal deposition system that can be used to selectively deposit metal on various surfaces without the use of external stimuli.

The invention includes a process to package the traditional electrolytes used in electroplating, brush plating or electroless plating in a conformable solid that can be used to deposit metals on any conductive surface by brushing or rubbing the conformable solid over the surface with minimal or no water. The invention provides ionic or nonionic electrolytes in moldable solid form, making the electrochemical process easily applicable on differently shaped substrates without using any liquid medium.

As a specific example, a new moldable copper based electrode-electrolyte assembly can be used to deposit copper without any liquid medium. This novel electrolyte assembly improves the ease of electroplating by minimizing or eliminating the need for using external power sources to trigger the electrochemical reaction.

The invention provides a unique way of packaging the electrolyte and eliminates the need for using a highly corrosive liquid electrolyte and the corrosive waste generated from the process. The new package can be used to perform electroless deposition on conductive and nonconductive surfaces. An advantage of this unique approach to perform metal deposition is that the deposition can be performed without any toxic/hazardous electrolyte solution and offers complete portability. The solid electrolyte is easily portable and requires no special equipment to perform deposition and can be used to deposit on hard to reach areas and intricate components.

The commercial value of the invention includes metal deposition on conductive and nonconductive surfaces. The invention is usable in heavy machinery, defense, military, automobiles, aerospace, oil & gas, semiconductors, electronics, optics, biomedical, jewelry, art, decorative, hobby and domestic maintenance activities.

Major plating and finishing industries such as heavy machinery manufacturing, aerospace, electronics, biomedical, optics, oil & gas, automotive companies that use expensive, complex, labor intensive metal deposition processes should be interested in the invention.

The new invention provides a completely electroless metal deposition process with the use of solid electrolyte, provides an electroless electrolytic process that improves the ease of deposition of metals on various conductive and nonconductive surfaces, eliminates needs for large quantities of electrolyte for electrodeposition, provides a completely portable electrolyte system and offers an alternative and low cost solution for metal deposition without need for complicated tools and equipment.

Currently metal deposition using electrochemical plating is limited to conductive surfaces. Other modes of metal deposition such as vapor, plasma or sputtering deposition are complicated, expensive and not suitable for large scale operations. Electroless metal deposition is an alternative technique but requires hazardous electrolyte and lacks the tools to perform on complex and intricate geometries, limiting the applications of the process.

The new simple method of depositing metal on conductive and nonconductive surfaces without the use of complex equipment is highly desirable for use in various industrial sectors.

The new and innovative method packages the electrolytes into a highly conformable tool to selectively deposit metal on various surfaces just by brushing/rubbing the tool on the surface with no need for an electrical power supply or a liquid electrolyte. This innovative packaging and tool offers a significant advantage to perform electroless metal deposition on any kinds of surfaces and geometries and suitable for a variety of applications where low cost, selective metal deposition is highly desired.

This invention provides electrode/electrolyte assemblies as well as solid or semisolid composite electrolyte materials as an alternative to traditional liquid based electrolytes, that could be used for standard electrochemical operations such as electroplating, electropolishing, electrowinning, electrochemical etching and anodization. The invention also provides a simple, scalable synthetic route to fabricate a highly moldable, solidified electrolyte for potential use in electrochemical applications especially electroplating, anodization, etching, etc. The invention also provides electrode/electrolyte assemblies which can be used for above mentioned electrochemical application.

Oceanit has developed a revolutionary approach of packaging ionic and nonionic electrolytes in moldable solid form, making the electrochemical process easily applicable on differently shaped substrates without dipping in or recirculating liquid electrolytes. As a specific example, Oceanit pursued the development of copper electroplating solution packaged in a moldable form that improved the brush plating process by eliminating the need for electrolyte recirculation or dipping of the brush plating wand in the electrolyte solution. By packaging the electrolyte in a solid form, Oceanit has eliminated the need for liquid electrolytes to be used in the brush plating process.

The invention provides a conformable electrolyte that can be molded in to any desired shape for hard to reach areas to fill large cracks and crevices and to provide a uniform and smooth surface finish.

Oceanit's invention uses a moldable electrode/electrolyte containing the required metal ion and the ability to perform plating. The approach of making moldable electrode/electrolyte also significantly improves the ability to perform plating and surface finishes operation even on regions unplatable using the traditional brush plating process.

The invention provides a solid electrolyte having precursor, binder and medium in solid or semisolid form and a tool having the product combined in an electrode/electrolyte assembly for electrochemical treatment of a substrate. The solid electrolyte includes metal salts, nanoparticles, organometallic precursor, polymer or ionic organic compounds. The binder includes polymers polyethylene oxide, polyacrylic acid, polyvinyl alcohol, polyvinyl pyrrolidone, silicones, inorganic binders, silicate, surfactants or cetyltrimethyl ammonium bromide. The medium includes aqueous (acidic & basic) or non-aqueous solvent, ionic liquid or aprotic solvent.

The solid electrolyte is a moldable or conformable solid or semisolid in moldable form.

In the invention the solid electrolyte material is an electrolyte electroplating, polishing, winning, etching or anodizing electrochemical and electroless plating.

The invention provides an ionic or nonionic electrolyte in a moldable solid or semisolid form. The ionic or nonionic electrolyte is a mixture of precursor, binder and medium.

The invention provides a method of forming a solid electrolyte with a mixture of electrochemical material and binder. The method further includes attaching the solid electrolyte and providing a handle on the electrode.

Holding the solid electrolyte with the handle and moving the solid electrolyte in contact with the surface of the substrate completes the process.

Holding the solid electrolyte with the handle and moving the solid electrolyte in contact with the surface of the substrate performs the deposition process, transferring precursor from the solid electrolyte to the surface of the substrate. The disparate base and coating metals may create autonomous bimetallic current that plates the coating metal on the base metal. When the base is a nonconductive material, a thin conductive layer or charge on the surface can be applied before metal deposition.

The precursor is a metal salt, copper chloride, chromium chloride, chromium sulfate, nickel sulfate, nickel formate, zinc sulfate, organic compounds, pyridine, pyrrole, aniline, organometallic compounds, trimethylgallium, trimethylindium or trimethylaluminum, as examples. The solid electrolyte precursor and the precursors are transferred from the solid electrolyte to a surface of the substrate by using the handle to move the solid electrolyte over the surface of the substrate.

Mixing the electrochemical material and polymer binder with or without fatty acid surfactant in a blender with or without solvent medium, pouring the blended mixture in a mold and drying the mixture forms the solid or semisolid electrolyte form for attachment to the electrode.

Mixing the electrochemical material and polymer binder with or without fatty acid surfactant in a blender with or without solvent medium, pouring the blended mixture in a mold for chemical or physical crosslinking the mixture, thereby forms the solid or semisolid electrolyte pad.

Mixing the electrochemical material and polymer binder with or without fatty acid surfactant in a blender with or without solvent medium, pouring the blended mixture in a mold having an electrode and drying the mixture or chemical or physical crosslinking thereby forms the solid or semisolid electrolyte/electrode assembly.

These and further and other objects and features of the invention are apparent in the disclosure, which includes the above and ongoing written specification, with the claims and the drawings.

BRIEF DESCRIPTION OF THE DRAWINGS

FIG. 1 is a photograph of a steel coupon and a new solid electrolyte.

FIG. 2 is a photograph of solid electrolyte rubbed on the surface of the steel coupon, resulting in copper deposition.

FIG. 3 is a photograph of copper deposited on a steel coupon using solid electrolyte.

DETAILED DESCRIPTION

FIG. 1 is a photograph of one example of the invention showing a steel coupon 10 and a new solid electrolyte block 20 for coating the steel coupon 10 with copper from the solid electrolyte block 20. Handle 30 extends from the solid electrolyte block 20 for holding and controlling the electrolyte block 20 as it is rubbed on the surface 12 of the steel coupon 10.

FIG. 2 is a photograph of solid electrolyte block 20 being rubbed on to the surface 12 of the steel coupon 10, resulting in copper deposition. A copper coating 22 is deposited on the surface 12 of the coupon 20, producing a copper coated surface 24 on the coupon 10.

FIG. 3 is a photograph of copper deposited on a steel coupon using solid electrolyte. Block 20 is shown to be round or oval. Any shape may be used.

In one form of the invention, fine copper precursor solution is embedded in a polymer binder, which is molded in a rigid mold or softened and formed into a desired shape, forming block 10.

A handle 30 with a rigid or flexible blade or other shaped body is embedded in the block 10 when the block is molded.

The electrolyte block could be composed of water soluble salts of transition metals such as copper, iron, nickel, chromium, gold, platinum, silver, etc. dispersed in a polymer solution such as polyethylene oxide, poly acrylic acid, polyvinyl alcohol, polyvinyl pyrrolidone, polyvinyl acetate, etc.

Examples of the metal salts that could be used to make electrolyte blocks could be copper sulfate, nickel sulfate, nickel acetate, chromium trioxide, silver nitrate, hydrogen tetrachloroaurate, gold cyanide, platinum chloride, etc.

The metal salt content in the electrolyte block could be from 0 to 95 weight % and remaining could be the polymer solution acting as a binder to hold the salt solution.

Depending upon the electrolyte salt and content, the polymer content could also be varied from 0 to 75 weight % dispersed in water or alkaline medium (potassium hydroxide, sodium hydroxide) or in acidic medium (sulfuric acid, nitric acid, chromic acid, hydrochloric acid, etc.) and could contain additional ion conducting materials 0 to 25 weight % such as ionic liquids, e.g. 1-butyl-3-methylimidazolium chloride (BMIMCl) or ionic salts such as sodium chloride, potassium chloride, sodium sulfate as supporting electrolytes.

Depending upon the nature of the metal, the electrolyte block would show a fading in color, suggesting the depletion of metal ions in the electrolyte block.

The method of manufacturing these electrolyte blocks could be performed using standard polymer mixing and extrusion processes or can be blended and heated together in large polymer mixers and cast into blocks or poured into molds of any desired size and shape.

This invention provides electrode electrolyte assemblies as well as solid or semisolid composite electrolyte materials as an alternative to traditional liquid based electrolytes that could be used for standard electrochemical operations such as electroplating, electropolishing, electrowinning, electrochemical etching and anodization. The invention also provides a simple, scalable synthetic route to fabricate a highly moldable, solidified electrolyte for potential use in electrochemical applications, especially electroplating, anodization, etching, etc. The invention also provides electrode/electrolyte assemblies which can be used for above-mentioned electrochemical application.

Oceanit has developed a revolutionary approach of packaging ionic and nonionic electrolytes in moldable solid form, making the electrochemical process easily applicable on differently shaped substrates without dipping in or recirculating liquid electrolytes. As a specific example, Oceanit pursued the development of copper electroplating solution packaged in a moldable form that improved the brush plating wand in the electrolyte solution. By packaging the electrolyte in a solid form, Oceanit has eliminated the need for liquid electrolytes to be used in the brush plating process.

The invention provides a conformable electrolyte that can be molded in to any desired shape for hard to reach areas to fill large cracks and crevices and to provide a uniform and smooth surface finish.

Oceanit's invention uses a moldable electrode/electrolyte containing the required metal ion and the ability to perform plating. The approach of making moldable electrode/electrolyte also significantly improves the ability to perform plating and surface finishes operation even on regions unplatable using the traditional brush plating process.

The invention provides a solid electrolyte having precursor, binder and medium in solid or semisolid form and a tool having the product combined in an electrode/electrolyte assembly for electrochemical treatment of a substrate. The solid electrolyte includes metal salts, nanoparticles, organometallic precursor, polymer or ionic organic compounds. The binder includes polymers polyethylene oxide, polyacrylic acid, polyvinyl alcohol, polyvinyl pyrrolidone, silicones, inorganic binders, silicate, surfactants or cetyltrimethyl ammonium bromide. The medium includes aqueous or non-aqueous solvent, ionic liquid or aprotic solvent.

The solid electrolyte is a moldable or conformable solid or semisolid in moldable form.

In the invention the solid electrolyte material is an electroplating, polishing, winning, etching or anodizing electrochemical, and the mechanical chemical treatment includes plating, polishing, winning, chemical etching or anodization and electroless plating.

The invention provides an ionic or nonionic electrolyte in a moldable solid or semisolid form. The ionic or nonionic electrolyte is a mixture of precursor, binder and medium.

The invention provides a method of forming a solid electrolyte with a mixture of electrochemical material and binder. The method further includes attaching the solid electrolyte and providing a handle on the electrode.

Holding the solid electrolyte with the handle and moving the solid electrolyte in contact with the surface of the substrate completes the process.

Holding the solid electrolyte with the handle and moving the solid electrolyte in contact with the surface of the substrate performs the material process, transferring precursor from the solid electrolyte to the surface of the substrate. The disparate base and coating metals may create autonomous bimetallic current that plates the coating metal on the base metal. When the base is a nonconductive metal, a thin conductive layer or charge on the surface can be applied before metal deposition.

The precursor is a metal salt, copper chloride, chromium chloride, nickel sulfate, organic compounds, pyridine, pyrrole, aniline, organometallic compounds, trimethylgallium, trimethylindium or trimethylaluminum, as examples. The solid electrolyte precursor and the precursors are transferred from the solid electrolyte to a surface of the substrate by using the handle to move the solid electrolyte over the surface of the substrate.

Mixing the electrochemical material and polymer binder with or without fatty acid surfactant in a blender with or without solvent medium, pouring the blended mixture in a mold and drying the mixture forms the solid or semisolid electrolyte form for attachment to the electrode.

Mixing the electrochemical material and polymer binder with or without fatty acid surfactant in a blender with or without solvent medium and pouring the blended mixture in a mold having an electrode and drying the mixture or chemical or physical crosslinking thereby forms the solid or semisolid electrolyte/electrode assembly.

The solid electrolyte contains high concentration of metal (copper, chromium, nickel etc.) which can release metal ions upon rubbing and applying electrical potential between electrode and the substrate only when the electrolyte is sufficiently hydrated. It is possible to store sufficient quantities of metal ions in the form of electrolyte and to deliver them to the necessary location as desired during the plating process. The use of a solid electrolyte to deliver the metal ions opens up new opportunities for brush plating with minimal chemical handling and easier portability. A novel solid copper electrolyte developed by the present invention can be readily used in place of the existing solution based brush plating with very little modification to the existing hardware. This new technique for copper and other metal brush or electroless plating will reduce the maintenance time and associated cost significantly.

A solid copper electrolyte for copper brush plating eliminates plating solution recirculation issues and improves the ability to perform plating even in tight spaces.

The fabricated solid copper electrolyte polymer is used for plating copper on steel coupons. Copper is deposited on the steel plate by rubbing the copper electrolyte over a steel plate.

While the invention has been described with reference to specific embodiments, modifications and variations of the invention may be constructed without departing from the scope of the invention, which is defined in the following claims.

We claim:

1. Apparatus comprising a metal electrolyte assembly adapted for selectively depositing metal on a surface without any external stimuli, a substrate having the surface, the metal electrolyte assembly further comprising a solid electrolyte block having a metal salt and a polymer solution acting as a binder, wherein the solid electrolyte block is adapted for rubbing on the surface on which metal from the metal salt is to be deposited.

2. The apparatus of claim 1, wherein the metal salt is a water soluble salt of transition metal.

3. The apparatus of claim 2, wherein the transition metal is copper, iron, nickel, chromium, zinc, gold, platinum or silver.

4. The apparatus of claim 2, wherein the metal salt is copper sulfate, nickel sulfate, nickel acetate, chromium trioxide, zinc sulfate, silver nitrate, hydrogen tetrachloroaurate, gold cyanide or platinum chloride.

5. The apparatus of claim 1, wherein the metal salt is up to 75 wt % of solid electrolyte block and the binder is a remainder.

6. The apparatus of claim 1, wherein the binder is a polymer solution.

7. The apparatus of claim 6, wherein the polymer solution forming the binder is up to 75 wt % of the solid electrolyte block and a remainder is the metal salt.

8. The apparatus of claim 6, wherein the polymer solution is polyethylene oxide, polyacrylic acid, polyvinyl alcohol, polyvinyl pyrrolidone or polyvinyl acetate.

9. The apparatus of claim 6, wherein the polymer solution is dispersed in water or alkaline medium or acidic medium and the binder contains up to 25 wt % ion conducting materials as supporting electrolytes.

10. The apparatus of claim 9, wherein the ion conducting materials are ionic liquids, 1-butyl-3-methylimidazolium chloride or sodium sulfate.

11. The apparatus of claim 1, wherein the binder is electrolyte solution and the solid electrolyte block comprises a block of the metal salts dispersed in the electrolyte solution.

12. The apparatus of claim 1, wherein the binder is a polymer and the metal salt and the polymer are mixed together and extruded or cast into blocks.

13. The apparatus of claim 1, wherein the solid has a handle having one portion connected to the solid electrolyte block and another portion extending from the solid electrolyte block.

14. A method comprising forming a solid electrolyte block adapted for selectively depositing metal on a surface without any external stimuli, by mixing a metal salt with a polymer solution acting as a binder and forming the solid electrolyte block with the mixed metal salt and the binder, providing a substrate having the surface, wherein the solid electrolyte block is adapted for rubbing on the surface on which metal from the metal salt is to be deposited.

15. The method of claim 14, further comprising rubbing the solid electrolyte block on the surface and plating the surface with a metal from the metal salt.

16. The method of claim 15, wherein the rubbing and plating is accomplished with minimal or no water.

17. The method of claim 14, wherein the metal salt is a water soluble salt of transition metal, and wherein the transition metal is copper, iron, nickel, chromium, zinc, gold, platinum or silver.

18. The method of claim 17, wherein the metal salt is copper sulfate, nickel sulfate, nickel acetate, chromium trioxide, zinc sulfate, silver nitrate, hydrogen tetrachloroaurate, gold cyanide or platinum chloride and the metal salt is up to 75 wt % of solid electrolyte block and the binder is a remainder.

19. The method of claim 17, wherein the polymer solution forming the binder is up to 75 wt % of the solid electrolyte block and a remainder is the metal salt, wherein the binder is a polymer solution and wherein the polymer solution is polyethylene oxide, polyacrylic acid, polyvinyl alcohol, polyvinyl pyrrolidone or polyvinyl acetate.

20. The method of claim 17, wherein the polymer solution is dispersed in water or alkaline medium or acidic medium and the binder contains up to 25 wt % ion conducting materials, and wherein the ion conducting materials are ionic liquids, 1-butyl-3-methylimidazolium chloride or sodium sulfate as supporting electrolytes.

21. The method of claim 17, wherein the binder is electrolyte solution, and the solid electrolyte block comprises a block of the metal salts dispersed in the electrolyte solution, and the metal salt and the electrolyte solution are mixed together and extruded or cast into blocks.

* * * * *